US012495096B2

(12) United States Patent
Kairali et al.

(10) Patent No.: US 12,495,096 B2
(45) Date of Patent: Dec. 9, 2025

(54) INTELLIGENT DIMENSIONALITY REDUCTION

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 270 days.

(21) Appl. No.: 18/152,735

(22) Filed: Jan. 10, 2023

(65) Prior Publication Data
US 2024/0236197 A1 Jul. 11, 2024

(51) Int. Cl.
H04L 67/51 (2022.01)
G06N 20/00 (2019.01)

(52) U.S. Cl.
CPC ............ H04L 67/51 (2022.05); G06N 20/00 (2019.01)

(58) Field of Classification Search
CPC .................................. H04L 67/51; G06N 20/00
See application file for complete search history.

(56) References Cited

U.S. PATENT DOCUMENTS

| 10,795,860 B1* | 10/2020 | Wallace | H04L 67/1097 |
| 11,985,058 B2* | 5/2024 | Adeel | H04L 43/067 |
| 2020/0162380 A1 | 5/2020 | Pilkington et al. | |
| 2021/0058484 A1 | 2/2021 | Pilkington et al. | |
| 2023/0169345 A1* | 6/2023 | Sharpe | G06N 3/0895 706/15 |
| 2023/0267017 A1* | 8/2023 | Moreau-Arnott | G06F 9/54 719/328 |
| 2024/0004973 A1* | 1/2024 | Bosch | G06F 21/31 |
| 2024/0020279 A1* | 1/2024 | Kumar | G06F 11/3452 |
| 2024/0104436 A1* | 3/2024 | Langford | G06F 18/214 |

FOREIGN PATENT DOCUMENTS

CN 114416331 A 4/2022

OTHER PUBLICATIONS

Authors et. al.: Disclosed Anonymously, "Intelligent Fast Forwarding of the Usual Suspects in a Microservice Chain Based on Minimum Data Dimensions", IP.com No. IPCOM000268436D (2022), 4 pgs.

* cited by examiner

Primary Examiner — Brian J. Gillis
Assistant Examiner — Juan C Turriate Gastulo
(74) Attorney, Agent, or Firm — CHIP LAW GROUP

(57) ABSTRACT

A method of optimizing parameter data passing between microservices in a service mesh includes receiving, by a vertical reduction interceptor, a data reduction condition of a target microservice. The data reduction condition is provided by a vertical reduction database. The method further includes intercepting, by the vertical reduction interceptor, a sender microservice that sends the parameter data to the target microservice and reducing, upon identifying that the parameter data meets the data reduction condition of the target microservice, a dimension of the parameter data based on the data reduction condition. The parameter data is sent to the target microservice. The data reduction condition is based on a specified user profile.

18 Claims, 9 Drawing Sheets

| UserID | UserName | Salary | Detail1 | ... | Detail N |
|--------|----------|--------|---------|-----|----------|

FIG. 8C

| UserID | UserName | Detail2 | ... | Detail9 |
|--------|----------|---------|-----|---------|
|  |  |  |  |  |
|  |  |  |  |  |
|  |  |  |  |  |

FIG. 8D

INTELLIGENT DIMENSIONALITY REDUCTION

BACKGROUND

Technical Field

The present disclosure generally relates to dimensionality reduction, and more particularly, to intelligently identifying reducing dataset dimensions in a service mesh based on a user profile.

Description of the Related Art

Software applications and improvements (such as new features, performance boosts, bug repairs, etc.,) have traditionally been provided in one sizable code under legacy development models. However, instead of waiting for lengthy software development cycles, new software features are now being provided relatively quickly via a microservices approach to software design.

A microservice architecture may provide a method for developing software applications, as suites of independently deployable, small, modular services, in which each service runs a unique process and communicates through a defined, lightweight, mechanism to serve a defined goal. Thus, a microservice architecture can be utilized to deploy a plurality of services that work together as a unique application.

BRIEF SUMMARY

According to an embodiment of the disclosure, a method includes optimizing parameter data passing between microservices in a service mesh by receiving, by a vertical reduction interceptor, a data reduction condition of a target microservice. The data reduction condition is provided by a vertical reduction database and the data reduction condition is based on a at least specified user profile. The method further includes intercepting, by the vertical reduction interceptor, a sender microservice that sends the parameter data to the target microservice. There is a reduction of, upon identifying that the parameter data meets the data reduction condition of the target microservice, a dimension of the parameter data. The parameter data is then sent to the target microservice.

In one embodiment, the data reduction condition is also based on a reducible dimensions knowledge corpus of the vertical reduction database.

In one embodiment, the method includes computing a first number of microservices in the service mesh that perform a machine learning routine and/or a data processing routine that is based on an outcome of the machine learning routine. There is a classification of each of the first number of microservices as a potential target microservice of one or more potential target microservices. Upon detecting that there is a transmission of parameter data to any of the one or more potential target microservices, the transmission is intercepted and the dimension of the parameter data is reduced based on the reducible dimension knowledge corpus (knowledge corpus of the reducible dimensions).

According to an embodiment of the present disclosure, a computer program product is disclosed. The computer program product includes one or more computer-readable storage devices and program instructions stored on at least one of the one or more tangible storage devices, the program instructions executable by a processor, the program instructions including program instructions to receive, by a vertical reduction interceptor, a data reduction condition of a target microservice, the data reduction condition is provided by a vertical reduction database and is based on at least a specified user profile. The program instructions cause the vertical reduction interceptor to intercept a sender microservice that sends parameter data to the target microservice, and the program instructions reduce, upon identifying that the parameter data meets the data reduction condition of the target microservice, a dimension of the parameter data. The computer program product also includes program instructions to send the parameter data to the target microservice. The data reduction condition is based on at least a specified user profile.

According to an embodiment of the present disclosure, a non-transitory computer-readable storage medium is disclosed. The non-transitory computer-readable storage medium tangibly embodies a computer readable program code having computer readable instructions that, when executed, causes a processor to receive, by a vertical reduction interceptor, a data reduction condition of a target microservice. The data reduction condition is provided by a vertical reduction database and is based on at least a specified user profile. The non-transitory computer-readable storage medium further causes the processor to intercept, by the vertical reduction interceptor, a sender microservice that sends the parameter data to the target microservice and reduce, upon identifying that the parameter data meets the data reduction condition of the target microservice, a dimension of the parameter data. The non-transitory computer-readable storage medium further causes the processor to send the parameter data to the target microservice.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 8C depicts a third dataset in accordance with an illustrative embodiment.

FIG. 8D depicts a fourth dataset in accordance with an illustrative embodiment.

DETAILED DESCRIPTION

Overview

Figure 1:
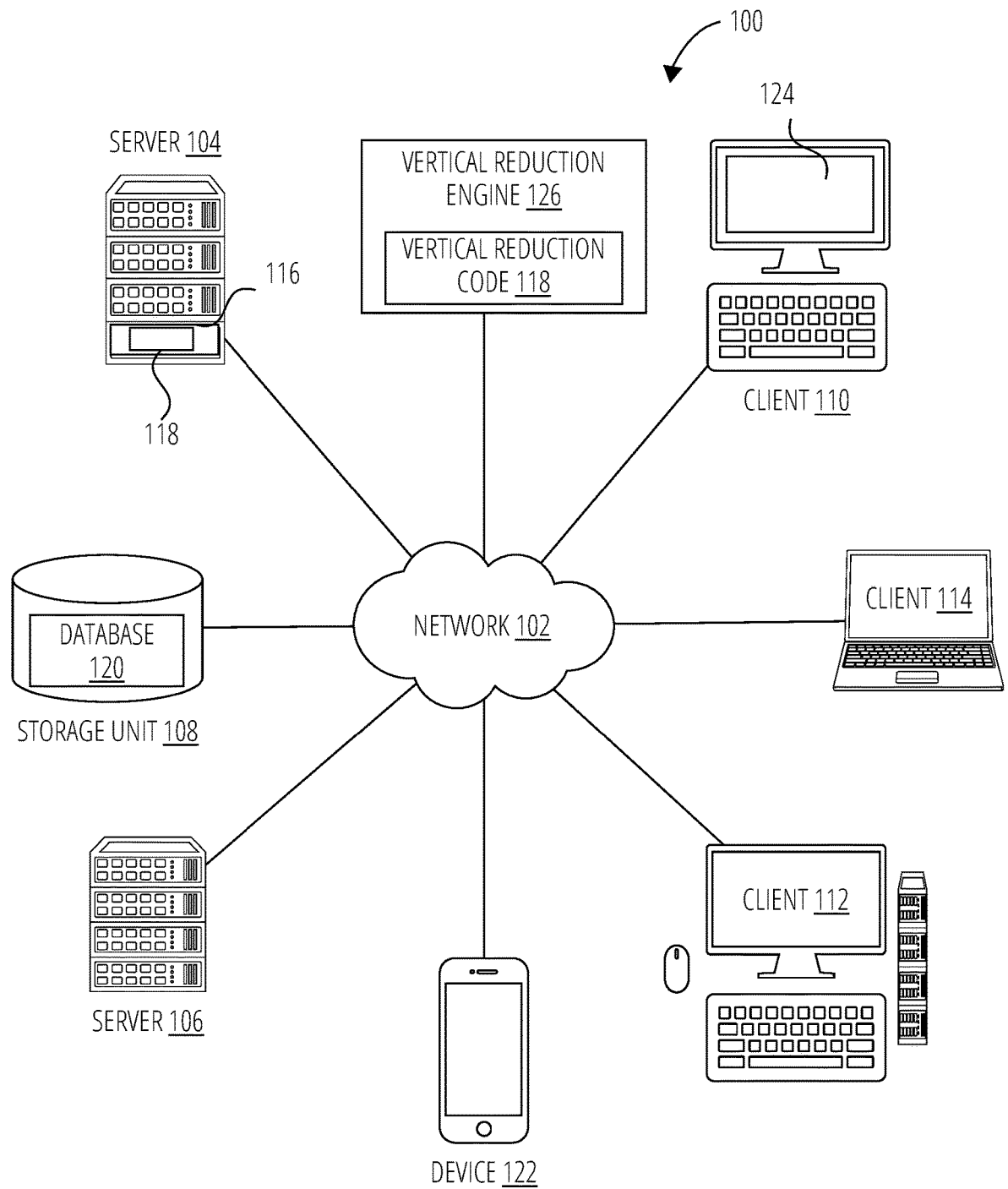
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Embodiments of the present disclosure relate to the field of computing, and more specifically to controlling the passage of large parameter data in a service mesh. The following described exemplary embodiments provide a system, method, and program product to, among other things, pass parameter data between a number of microservices. Therefore, the present embodiment has the capacity to improve the technical field of controlling traffic between services in computer systems by determining data not required by target microservices and reducing dimensionality of the parameter data accordingly, thus optimizing the service mesh.

A service mesh is a programmable infrastructure layer for a microservices application that aids in traffic management between services in computer systems, enabling functions like load balancing, scaling, AB testing, canary testing, etc.

Microservice interactions can be as basic as transferring small quantities of data from one service to another, or they can be more complicated such as transmitting data along sequences of microservices. A microservice may execute a portion of the total application function and utilize a subset of the data. A microservice may serve as a conduit for extra parameter data that is used by other downstream microservices. It is recognized however, that when extra parameter data is transferred from one service to another, it may consume network, memory, and CPU resources, which may have a negative impact on performance and increase overhead. For example, a first microservice may transfer data to a second microservice. The second microservice may perform a machine learning process based on the received data. Due to the large amount of data that may be received by the second microservice and the second microservice being configured for machine learning, the execution time of the application may be significantly increased especially when the second service mesh is engaged often.

The illustrative embodiments disclose optimizing parameter data passing between microservices in a service mesh by receiving a data reduction condition of a target microservice, the data reduction condition being received from a vertical reduction database and the data reduction condition being based on a specified user profile. The illustrative embodiments intercept, by the vertical reduction interceptor, a sender microservice configured to send the parameter data to the target microservice and reduce, responsive to identifying that the parameter data meets the data reduction condition of the target microservice, a dimension of the parameter data based on the data reduction condition. The illustrative embodiments then send the parameter data to the target microservice.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. A method of an embodiment described herein, when implemented to execute on a device or data processing system, provides substantial advancement of the functionality of that device or data processing system by enabling user profile based dimensionality reduction in a service mesh architecture to optimize parameter data passage.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1 these figures are example diagrams of data processing environments in which illustrative embodiments may be implemented. FIG. 1 is only an example and is not intended to assert or imply any limitation with regard to the environments in which different embodiments may be implemented. A particular implementation may make many modifications to the depicted environments based on the following description.

Data Processing Environment

FIG. 1 depicts a block diagram of a network of data processing systems in which illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (client 110, client 112, client 114, vertical reduction engine 126) may include data and may have software applications or software tools executing thereon. Server 104 and server 106 may include one or more GPUs (graphics processing units) for machine learning.

Only as an example, and without implying any limitation to such architecture, FIG. 1 depicts certain components that are usable in an example implementation of an embodiment. For example, servers and clients are only examples and do not imply a limitation to a client-server architecture. As another example, an embodiment can be distributed across several data processing systems and a data network as shown, whereas another embodiment can be implemented on a single data processing system within the scope of the illustrative embodiments. Data processing systems (vertical reduction engine 126, server 104, server 106, client 110, client 112, and client 114) also represent example nodes in a cluster, partitions, and other configurations suitable for implementing an embodiment.

Server 104, server 106, storage unit 108, client 110, client 112, client 114, device 122, and vertical reduction engine 126 may couple to network 102 using wired connections, wireless communication protocols, or other suitable data connectivity. Client 110, client 112, and client 114 may be, for example, personal computers or network computers.

In the depicted example, the servers may provide data, such as boot files, operating system images, and applications to client 110, client 112, and client 114. Client 110, client 112, and client 114 may be clients to servers in this example. Client 110, client 112, and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or vertical reduction engine 126 may include vertical reduction code 118 configured to optimize parameter data passing between microservices in a service mesh based on user profile based dimensionality reduction. In some embodiments, vertical reduction engine 126 may be or form a part of a server or client described herein.

Device 122 is an example of a device described herein. For example, device 122 can take the form of a smartphone, a tablet computer, a laptop computer, client 110 in a stationary or a portable form, a wearable computing device, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may be or include stores one or more term change histories and word frequency histories stored in repositories for computations herein.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as vertical reduction code 118. In addition to vertical reduction code 118, computing environment 200 includes, for example, computer 202, wide area network 228 (WAN), end user device 230 (EUD), remote server 232, public cloud 240, and private cloud 236. In this embodiment, computer 202 includes processor set 204 (including processing circuitry 206 and cache 208), communication fabric 210, volatile memory 212, persistent storage 214 (including operating system 216 and vertical reduction code 118, as identified above), peripheral device set 218 (including user interface (UI) device set 220, storage 222, and Internet of Things (IoT) sensor set 224), and network module 226. Remote server 232 includes remote database 234. Public cloud 240 includes gateway 238, cloud orchestration module 242, host physical machine set 246, virtual machine set 244, and container set 248.

Figure 2:
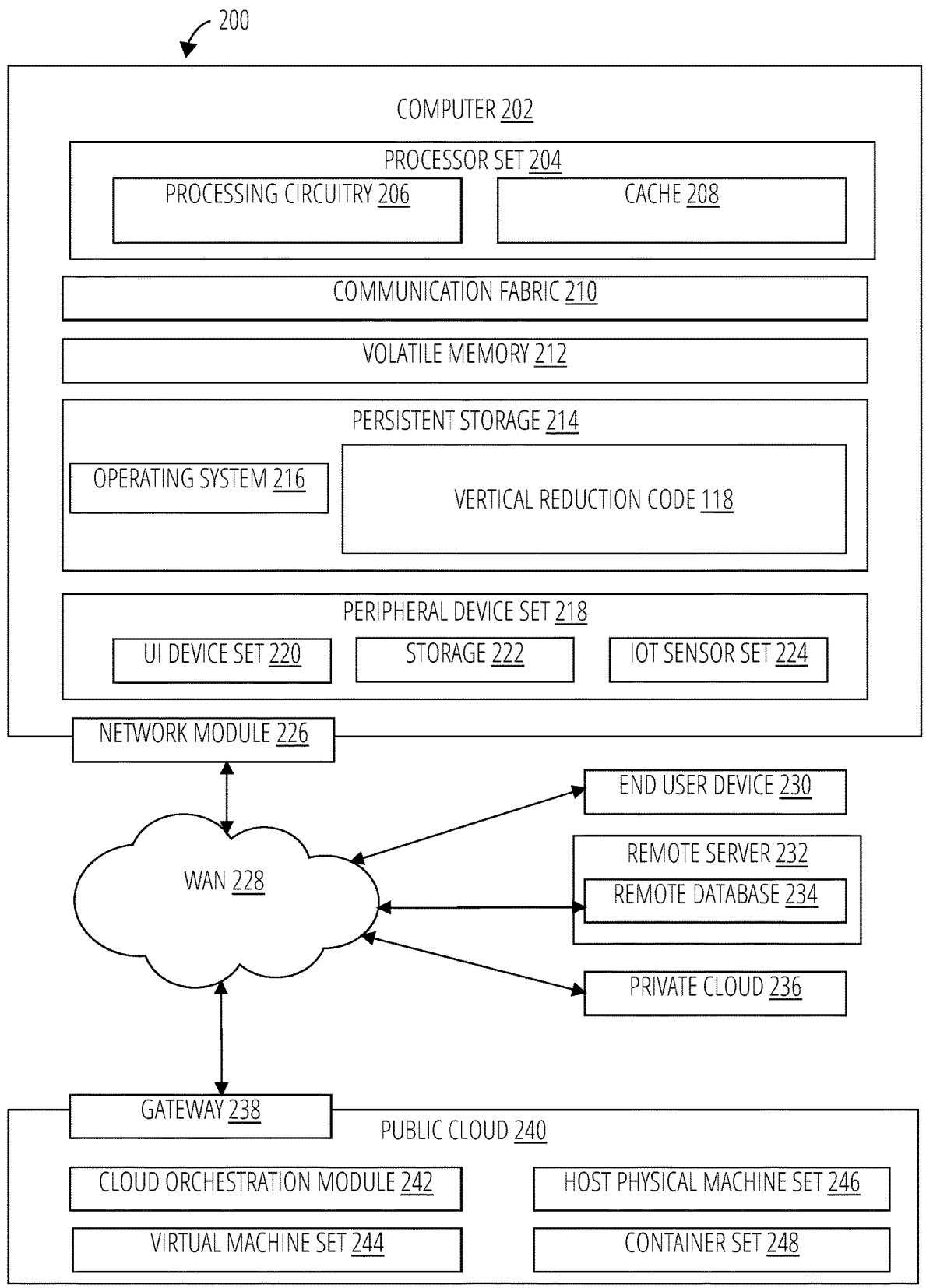
FIG. 2 depicts a block diagram of a computing environment in accordance with an illustrative embodiment.

COMPUTER 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 202, to keep the presentation as simple as possible. Computer 202 may be located in a cloud, even though it is not shown in a cloud in FIG. 2. On the other hand, computer 202 is not required to be in a cloud except to any extent as may be affirmatively indicated.

PROCESSOR SET 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto computer 202 to cause a series of operational steps to be performed by processor set 204 of computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in vertical reduction code 118 in persistent storage 214.

COMMUNICATION FABRIC 210 is the signal conduction path that allows the various components of computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 212 is any type of volatile memory now known or to be developed in the future. Examples include dynamic type random access memory (RAM) or static type RAM. Typically, volatile memory 212 is characterized by random access, but this is not required unless affirmatively indicated. In computer 202, the volatile memory 212 is located in a single package and is internal to computer 202, but, alternatively or additionally, the volatile memory may be distributed over multiple packages and/or located externally with respect to computer 202.

PERSISTENT STORAGE 214 is any form of non-volatile storage for computers that is now known or to be developed in the future. The non-volatility of this storage means that the stored data is maintained regardless of whether power is being supplied to computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid state storage devices. Operating system 216 may take several forms, such as various known proprietary operating systems or open source Portable Operating System Interface-type operating systems that employ a kernel. The code included in vertical reduction code 118 typically includes at least some of the computer code involved in performing the inventive methods.

PERIPHERAL DEVICE SET 218 includes the set of peripheral devices of computer 202. Data communication connections between the peripheral devices and the other components of computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where computer 202 is required to have a large amount of storage (for example, where computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

NETWORK MODULE 226 is the collection of computer software, hardware, and firmware that allows computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 230 is any computer system that is used and controlled by an end user (for example, a customer of an enterprise that operates computer 202) and may take any of the forms discussed above in connection with computer 202. EUD 230 typically receives helpful and useful data from the operations of computer 202. For example, in a hypothetical case where computer 202 is designed to provide a recommendation to an end user, this recommendation would typically be communicated from network module 226 of computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

REMOTE SERVER 232 is any computer system that serves at least some data and/or functionality to computer 202. Remote server 232 may be controlled and used by the same entity that operates computer 202. Remote server 232 represents the machine(s) that collect and store helpful and useful data for use by other computers, such as computer 202. For example, in a hypothetical case where computer 202 is designed and programmed to provide a recommendation based on historical data, then this historical data may be provided to computer 202 from remote database 234 of remote server 232.

PUBLIC CLOUD 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Example Architecture

Figure 3:
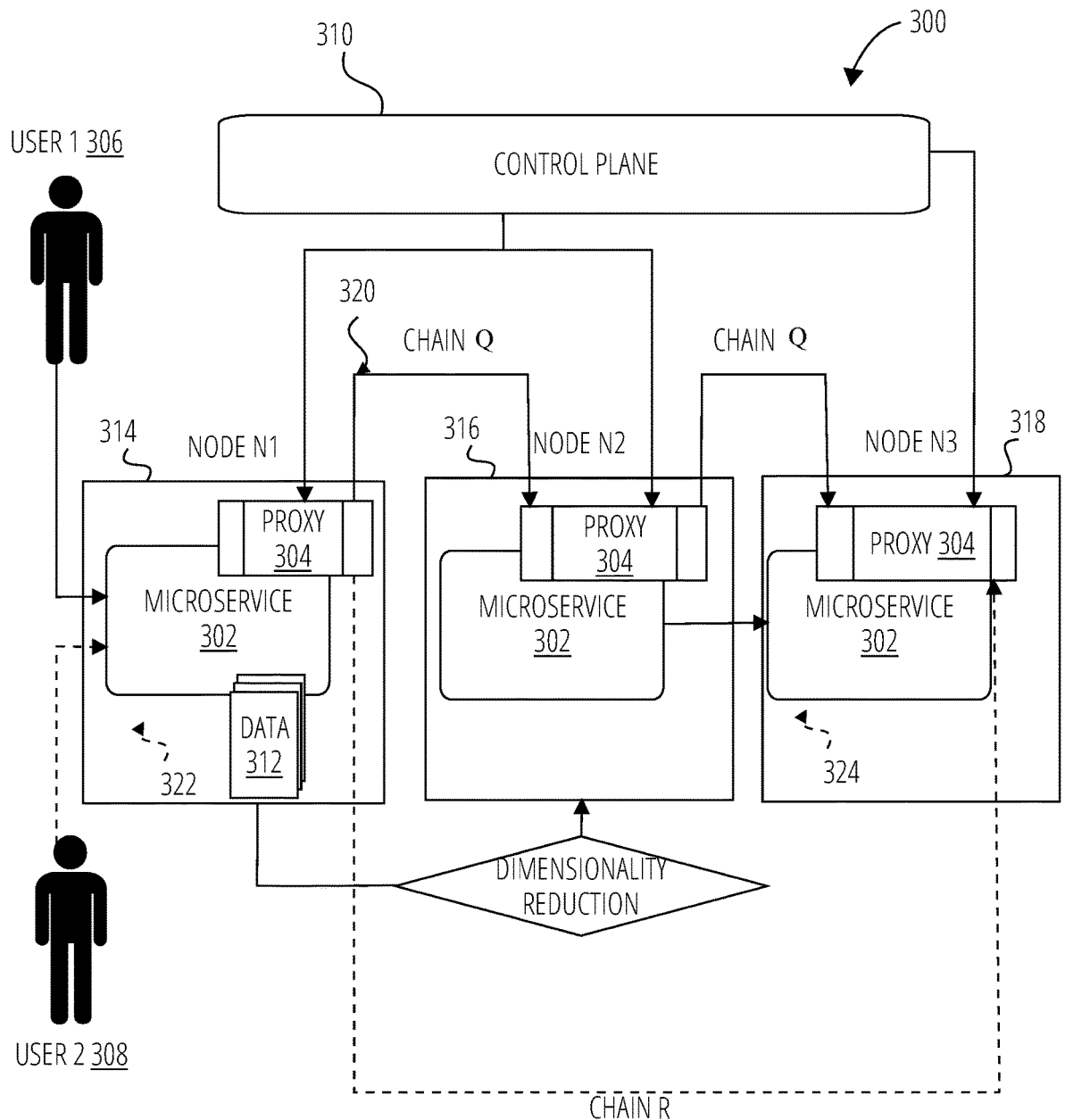
FIG. 3 depicts a block diagram of a service mesh configuration in accordance with an illustrative embodiment.

Turning now to FIG. 3, an example configuration of a service mesh 300 is shown. embodiment. The service mesh 300 comprises a plurality of microservices 302, a proxy 304, a first user 306, a second user 308, a control plane API 310 (Application Programming Interface), parameter data 312, and microservice nodes, node N1 314, node N2 316, and node N3 318.

Each microservice node of the service mesh 300, and thus microservice, may be selectively operable as a sender and as a target. As shown in the figure, the service mesh 300 may comprise at least two nodes N1 and N2 that send or receive data via proxy 304. In practice, there may be many such nodes, and some of these nodes may perform the same microservice. Generally, the nodes will require different sets of input data, i.e., different data parameters, to be able to start execution of their microservices. Until they are able to start, the nodes may be blocked by control programs.

The service mesh 300 has a data plane represented logically by microservices 302 of the nodes and proxies 304, which are linked by communication links 320 with protocols such as HTTP/1.1, HTTP/2, gRPC, or TCP, with or without mTLS. The proxies may be intelligent proxies that mediate and control network communication between the microservices and may cooperate with policy and telemetry control hubs. A logical control plane manages and configures the proxies to route traffic. In the figure, the control plane is represented by a control plane API 310. There may typically be components in the control plane that enforce access control and usage policies across the mesh and collect telemetry data. The proxy 304 at each node can extract request level attributes and send them to control plane for evaluation.

The service mesh 300 may be configured to perform data processing tasks based on an input request or input data from a one or more users (for example, from a first user 306 or a second user 308). A data processing task may utilize a chain of microservices 302, which may be engaged sequentially based on the user's input request type. A first task can be performed at a first node, node N1 314, which then becomes a sender node containing a sender microservice. As a sender node, it may output the result of its own microservice as a new request including input data for a second node, node N2 316 which is the target microservice. The input data may comprise data parameters relating to different respective attributes of the user/consumer for whom services are performed by the service mesh. Node N2 316 receives this new request including input data that may include the data that was generated by the execution of the first task. The transmission from node N1 314 to node N2 316 is performed by a proxy 304 and node N2 316 may now perform a second task via its microservice, become a sender node and transmit, via its corresponding proxy, data generated from performing the second task to node N3 318 (the new target node). This overall process may continue, over multiple nodes in a chain (CHAIN Q) based on the specific request received from the user until the overall service comprising multiple tasks has been completed, and the results output back to the gateway.

In some embodiments, a target microservice may be configured to use less data that the output data produced by a sender microservice. For example, the microservice of node N2 316 may be configured to use a subset of parameter data 312. Prior to sending parameter data 312 (which includes, for example, username entries, password entries and age entries) to node N2 316 (which computes average age, for example), the subset of parameter data 312 that is not needed by the microservice of node N2 316 (password entries) may be removed as described hereinafter.

In some embodiments, a node may not be needed when performing a series of tasks for a specified user. For example, the micro service of node N2 316 may not be needed to complete an input request of the second user 308 and thus node N2 316 may be skipped in the chain (CHAIN R) as shown in FIG. 3. Herein, the microservice of node N1 314 is the sender microservice 322 and the micro service of node N3 318 is the target microservice.

Figure 4:
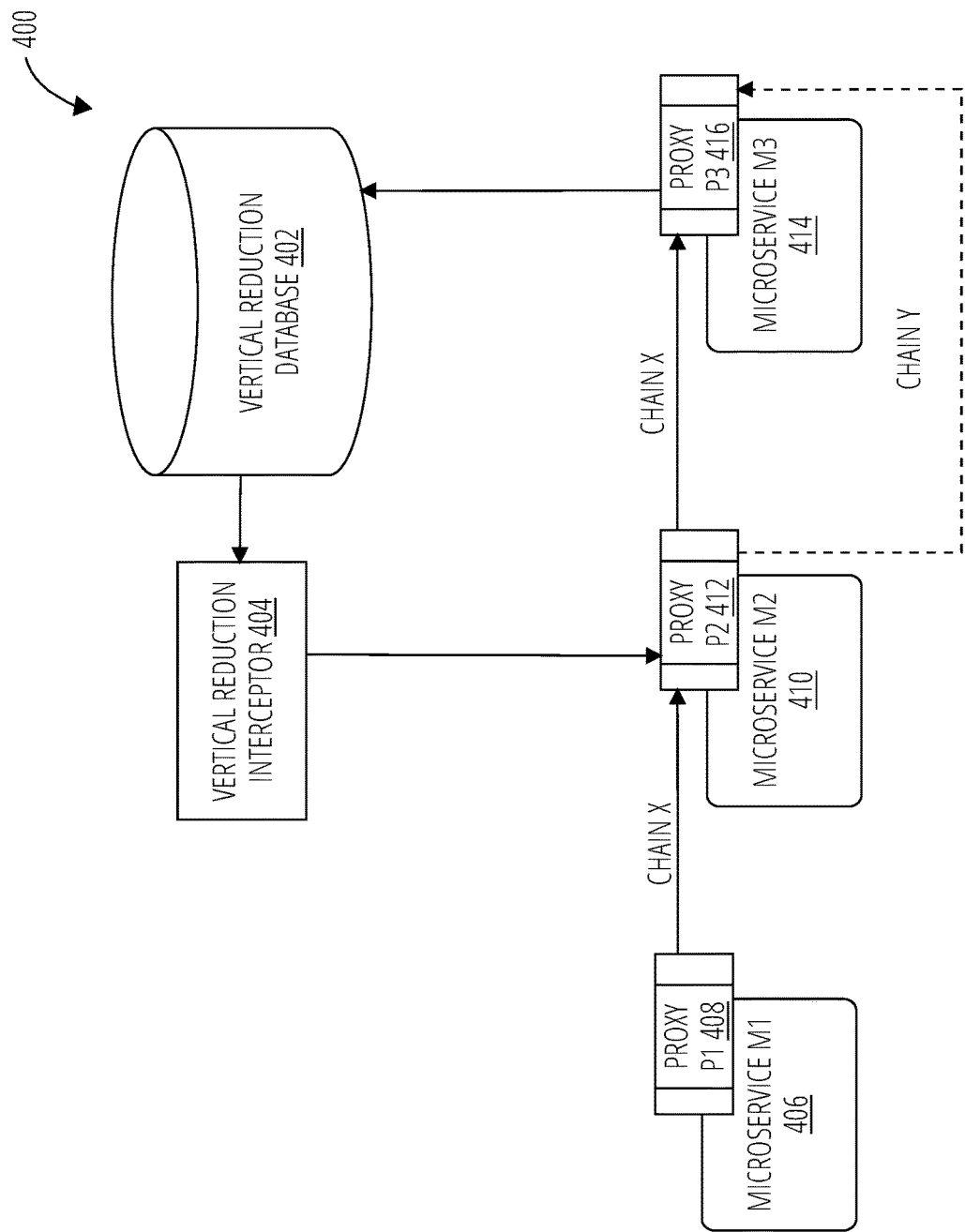
FIG. 4 depicts a block diagram of vertical reduction service mesh in accordance with an illustrative embodiment.

FIG. 4 illustrates a block diagram of vertical reduction service mesh 400 in accordance with an illustrative embodiment. The mesh comprises a vertical reduction database 402, a vertical reduction interceptor 404, and a plurality of microservices and corresponding proxies, i.e., microservice M1 406, proxy P1 408, microservice M2 410, proxy P2 412, microservice M3 414, and proxy P3 416, wherein a first non-limiting chain of microservices (CHAIN X) include M1, M2 and M3 and a second non-limiting chain of microservices (CHAIN Y) includes M2 and M3.

In an example, the mesh may be an Istio™ mesh. An Istio™ service mesh is logically split into a data plane and a control plane. The data plane comprises a set of intelligent proxies deployed as sidecars—these may be known by the name Envoy. They mediate and control the network communication between the microservices. The control plane is an API that manages and configures the proxies to route traffic. Accordingly, embodiment herein may be used in an Istio™ mesh by suitable programming. The sender microservice and target microservice programs may then be processes in the same container as the sidecar proxy.

Alternatively, the programs may be processes in another container within a Kubernetes® pod. Kubernetes® is an open-source container-orchestration system for automating deployment, scaling and management of containerized applications.

The vertical reduction service mesh 400 is configured to optimize parameter data passing between microservices in the service mesh by obtaining, by the vertical reduction interceptor 404, a data reduction condition of a target microservice in a microservice chain. The vertical reduction interceptor 404 is a control plane component that communicates to proxies 304 in the data plane and sends vertical reduction commands to the proxies 304 comprising instructions to reduce dimensions of parameter data based on a historical reducible dimension knowledge corpus recorded in the vertical reduction database 402 by one or more microservices. The data reduction condition may be obtained from the vertical reduction database 402 which is configured to store historical information about data types not used by a target microservice. The data types that are not used are sometimes referred to herein as reducible dimensions. In some embodiments, the data reduction condition may be based on entries in the vertical reduction database 402 corresponding to user profiles initiating the input request and for each user profile, the reducible dimensions that are not used. The vertical reduction database 402 may also include other data reduction or task identifying information including information about the target microservice.

Figure 7:
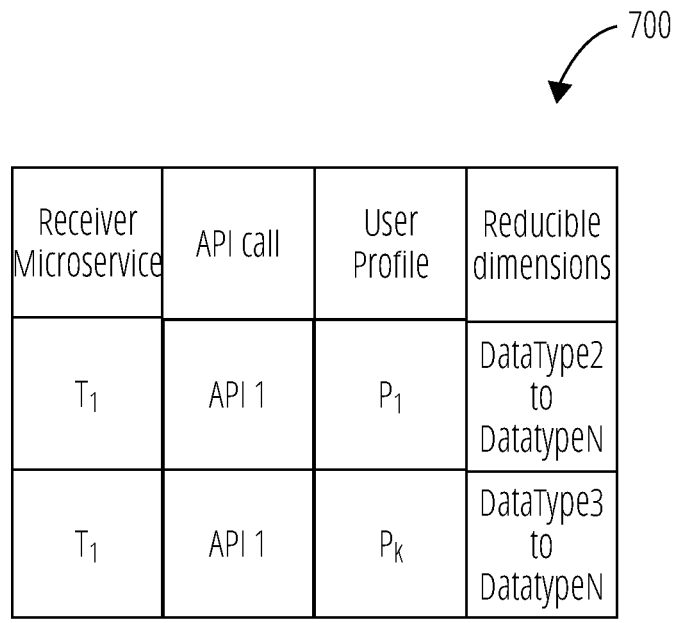
FIG. 7 depicts a first reducible dimensions mapping of a vertical reduction database in accordance with an illustrative embodiment.

The vertical reduction database may thus include at least one or more of: information about the reducible dimensions, information about the input request/API call, information about a specified user profile corresponding to the input request/API call, and information about the target microservice as shown in FIG. 7.

The vertical reduction interceptor 404 may be configured to intercept the proxy of a sender microservice prior to the proxy transmitting the parameter data to a target microservice. The parameter data may include different respective attributes of the specified user for whom services are performed by the service mesh.

Responsive to identifying that the target microservice and parameter data meets the data reduction condition (for example, when a count of the number of times a type of user specified data that has not been used by the target microservice exceeds a predefined threshold and the type of data is in the parameter data), a dimension of the parameter data is reduced. The dimensionality reduced parameter data is then transmitted to the target microservice via a proxy.

In an embodiment, each microservice that may receive data can record historical usage information in vertical reduction database 402 using data in parameter data that were not used in executing a task.

Turning back to FIG. 4, the vertical reduction service mesh 400 may be employed in a variety of systems including, for example, an artificial intelligence or statistical data processing systems wherein one or more sender microservices transmit large amounts of data (for example terabytes of data, though this is not meant to be limiting) and wherein one or more target microservices receive the large amounts of data for machine learning or statistical analysis. Advantageously, the architecture disclosed may be even more powerful when there is little to no churn over data dimensions, even if the data is significantly large with a high number of entries. It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Figure 5:
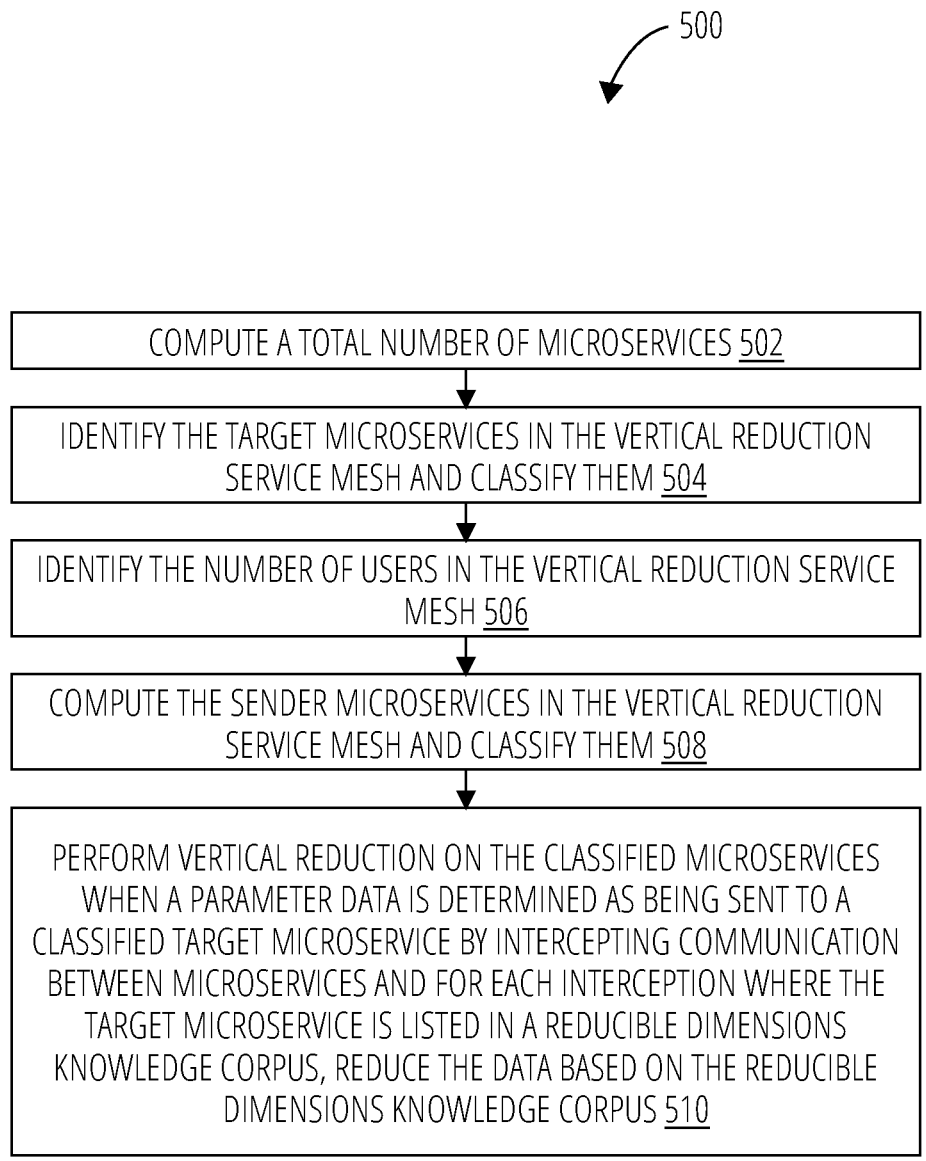
FIG. 5 illustrates a routine in accordance with one embodiment.

FIG. 5 illustrates a routine 500 for operating the vertical reduction service mesh 400. The routine may be performed by vertical reduction engine 126 using vertical reduction code 118. The routine 500 may comprise computing a total number of microservices in the vertical reduction service mesh 400, a number of microservices that perform machine learning and/or statistical analysis procedures, and a number of microservices that transmit data to other microservices.

More specifically, in block 502, vertical reduction engine 126 computes a total number of microservices. In block 504, vertical reduction engine 126 computes the target microservices in the vertical reduction service mesh 400 based on a defined rule and classifies them in the vertical reduction database 402. More specifically, for a total number of X microservices in a vertical reduction service mesh 400, a number of microservices performing machine learning and/or statistical analysis (J) are computed and classified as target microservices 324, (where J<X).

In block 506, vertical reduction engine 126 identifies the number of users in the vertical reduction service mesh. For example, there may be K users in the service mesh and each user may have a corresponding user profile which may be marked as, P1, P2 . . . to Pk.

In block 508, vertical reduction engine 126 computes the potential sender microservices in the vertical reduction service mesh based on a defined rule and classifies them. For example, vertical reduction service mesh 400 may identify M microservices in the system which can send data to the target microservices wherein M≤X−J. Assuming $T_1$ to $T_J$ are the identified target microservices and $S_1$ to $S_M$ are the identified sender microservices, each microservice of $T_1$ to $T_J$ and $S_1$ to $S_M$ may qualify for a vertical reduction as described herein.

In block 510, vertical reduction engine 126 performs vertical reduction on a classified microservice. For example, in an embodiment, when a parameter data is determined as being sent to a classified target microservice the vertical reduction interceptor 404 may intercept the transmission and reduce dimensions of the parameter data regardless of the sender microservice. In another embodiments, the vertical reduction interceptor 404 may intercept the transmission and reduce dimensions of the parameter data if the sender microservice satisfies predetermined criteria. In further embodiments, a microservices chain corresponding to a user input request and the vertical reduction interceptor 404 may intercept the transmission from any sender microservice in the chain prior to receipt of the parameter data by the target microservice. Thus, there may be one or more intermediate microservices between the target microservice and the sender microservice in a microservice chain corresponding to a request of the specified user, or there may be no intermediate microservices between the target microservice and the sender microservice in a microservice chain corresponding to a request of the specified user.

In one or more embodiments, the dimensionality reduction of the parameter data may be based on a reducible dimension knowledge corpus or mapping of the vertical reduction database 402.

Figure 6:
FIG. 6 depicts a first dataset in accordance with an illustrative embodiment.

FIG. 6-FIG. 7 disclose an example of the vertical reduction process described herein. In FIG. 6, a dataset 600 comprising columns of N data types, DataType1-DataTypeN is shown. A sender microservice $S_1$ may send dataset 600 to target microservice $T_1$ for user profile $P_k$ as part of an API call, API 1. In this example, $T_1$ may use a subset of the columns in dataset 600. For example, $T_1$ may utilize DataType3-DataTypeN for user profile $P_k$. Thus, DataType1 to DataType2 may be marked as reducible dimensions.

The sender microservice $S_1$ may also send dataset 600 to target microservice $T_1$ for another user profile $P_1$ as part of the API call (API 1). In the present example, $T_1$ may use a subset of the columns in dataset 600, DataType2-DataTypeN for the another user profile $P_1$. Thus, DataType1 may be marked as a reducible dimension. Each target microservice for each user profile, may send the reducible dimensions to the control plane which keeps track of this mapping, illustrated in FIG. 7 as the reducible dimension knowledge corpus 700, for the APIs that are invoked.

Responsive to generating the reducible dimension knowledge corpus 700, vertical reduction engine 126 may operate the vertical reduction interceptor 404 to intercept communications between microservices if the receiving microservice is listed as a target microservice in the vertical reduction database 402 and more specifically, the reducible dimension knowledge corpus 700. The vertical reduction interceptor 404 may send instructions to a proxy based on a data reduction condition obtained from evaluating the reducible dimension knowledge corpus 700 or vertical reduction database 402. The vertical reduction databases 402 may have all the information reported by dataplane (all proxies) as the proxies may allow any microservice to report any reducible dimensions to control plane per user profile and API call. Thus, instead of sending a large data set the vertical reduction engine 126 may configure proxies such as ENVOY to performed dimensionality reduction operations and optimize parameter data passing between microservices.

Figure 8A:
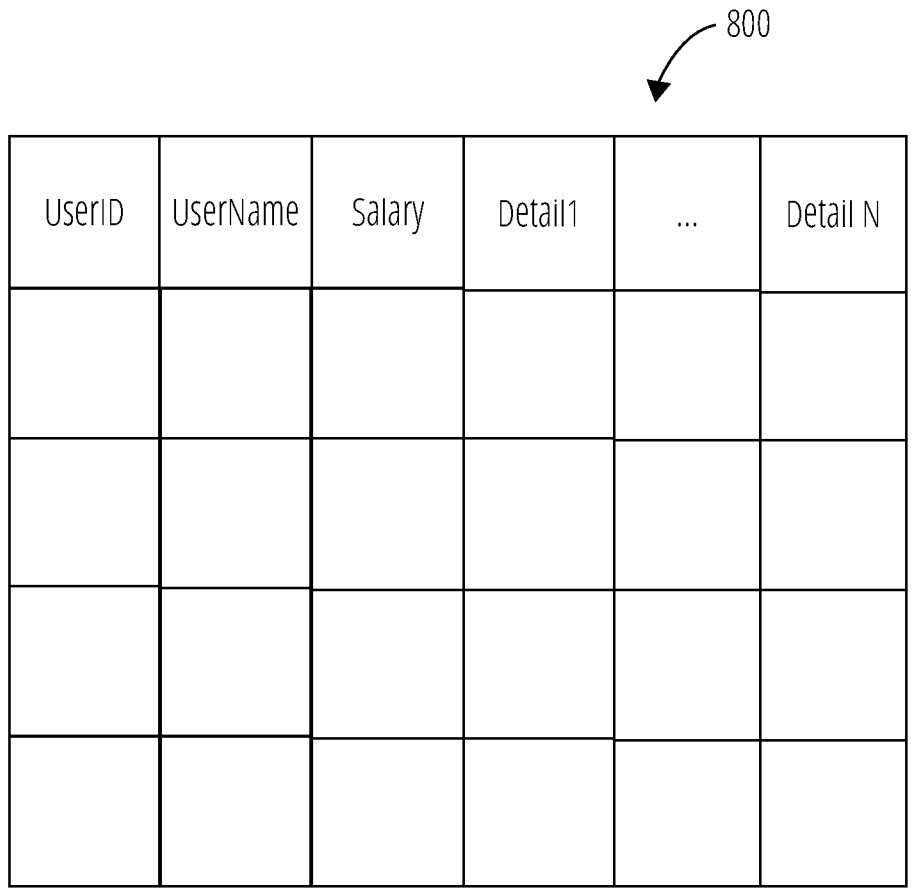
FIG. 8A depicts a second dataset in accordance with an illustrative embodiment.
Figure 8B:
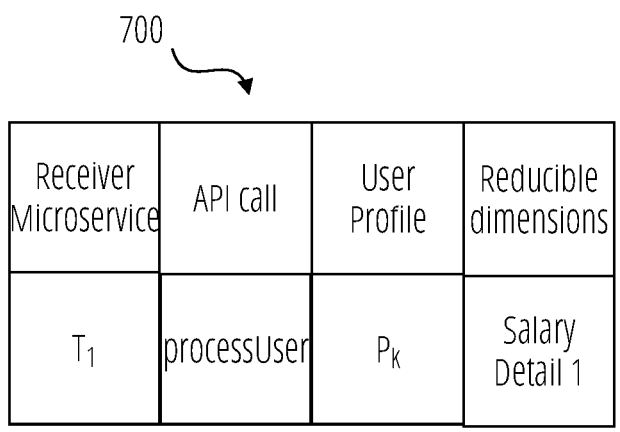
FIG. 8B depicts a second reducible dimension mapping of a vertical reduction database in accordance with an illustrative embodiment.

In a further example as shown in FIG. 8A-FIG. 8D, a sender microservice $S_1$ may send dataset 800 (FIG. 8A) to target microservice $T_1$ for user profile $P_k$ on API call processUser (see FIG. 8B). The vertical reduction engine 126 may evaluate a large dataset size condition. Responsive to computing that the dataset 800 satisfies the large dataset size condition, and the target microservice is listed in the vertical reduction database or reducible dimension knowledge corpus, the vertical reduction engine 126 may engage the control plane to identify the columns of the datasets 800 (see FIG. 8C), intercept the traffic and command the proxy of sender microservice $S_1$ to reduce all the reducible dimensions (Salary and Detail 1). Assuming that N=9, the proxy of $S_1$ then transmits the reduced dataset of FIG. 8D, which now has 10 columns, via API call processUser.

In another example, if a microservice $Y_1$ sends parameter data to microservice $Y_2$, and machine learning occurs at microservice $Y_3$, with $Y_3$ receiving data from $Y_2$, wherein $Y_1$, $Y_2$, and $Y_3$ are in a microservices chain of a specified API call of a specified user, not only can vertical reduction be performed for the $Y_3$ target microservice at the $Y_2 \rightarrow Y_3$ transmission, but vertical reduction can alternatively be performed for the $Y_3$ target microservice at the $Y_1 \rightarrow Y_2$ transmission to reduce the dimensionality of the performance data. Of course, the examples given herein are not meant to be limiting as variations may be obtained in view of the descriptions.

Further, when new dimensions are added to the parameter data, the handshake layer retrains itself with the optimal number of data dimensions needed through, for example, the proxy of the target microservice recording the new dimension accordingly to the vertical reduction database 402 of the control plane. Thus, the reducible dimensions may be kept updated.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of optimizing parameter data passing between microservices in a service mesh, the computer-implemented method comprising:
   receiving, by a vertical reduction interceptor, a data reduction condition of a target microservice of the microservices, the data reduction condition being provided by a vertical reduction database, wherein
      the data reduction condition is based on historical usage information, of the target microservice, specifying a plurality of types of data not used by the target microservice during an execution of a historical task, and
      the plurality of types of data, not used by the target microservice in the execution of the historical task, is stored as reducible dimensions in the vertical reduction database;
   intercepting, by the vertical reduction interceptor, a sender microservice of the microservices configured to send the parameter data to the target microservice;
   reducing, responsive to identifying that the parameter data meets the data reduction condition of the target microservice provided by the vertical reduction database, a dimension of the parameter data based on the data reduction condition; and
   sending the parameter data to the target microservice, wherein the data reduction condition is further based on at least a specified user profile.

2. The computer-implemented method of claim 1, wherein the data reduction condition is further based on a reducible dimension knowledge corpus of the vertical reduction database.

3. The computer-implemented method of claim 1, wherein the target microservice initiates storage of the reducible dimensions in the vertical reduction database.

4. The computer-implemented method of claim 1, wherein:
   the vertical reduction database stores a count tracking a number of times a type of data, of the plurality of types of data, is not used by the target microservice; and
   the data reduction condition is further based on the count.

5. The computer-implemented method of claim 1, wherein the sender microservice is configured to send the parameter data to the target microservice via a proxy of the sender microservice.

6. The computer-implemented method of claim 1, wherein there are no intermediate microservices between the target microservice and the sender microservice in a microservice chain corresponding to a request from a specified user.

7. The computer-implemented method of claim 1, wherein there are one or more intermediate microservices between the target microservice and the sender microservice in a microservice chain corresponding to a request from a specified user.

8. The computer-implemented method of claim 1, further comprising:
   computing a first number of microservices in the service mesh that perform at least one of a machine learning routine or a data processing routine that is based on an outcome of the machine learning routine;
   classifying each of the first number of microservices as a potential target microservice of one or more potential target microservices; and
   responsive to a transmission of the parameter data to any of the one or more potential target microservices, intercepting the transmission and reducing the dimension of the parameter data.

9. The computer-implemented method of claim 1, further comprising:
   computing a first number of microservices in the service mesh that perform at least one of a machine learning routine or a data processing routine based on an outcome of the machine learning routine;
   computing a second number of microservices in the service mesh that send the parameter data to any of the first number of microservices;
   classifying each of the first number of microservices as a potential target microservice of one or more potential target microservices and each of the second number of microservices as a potential sender microservice of one or more potential sender microservices;

responsive to any of the one or more potential sender microservices sending the parameter data to any of the one or more potential target microservices:
  intercepting a proxy of the any of the one or more potential sender microservices; and
  reducing the dimension of the parameter data based on the specified user profile.

10. The computer-implemented method of claim 1, wherein the parameter data comprises a dataset having a size that meets a defined large data size threshold.

11. A computer program product, comprising:
one or more computer-readable storage devices; and
program instructions stored on at least one of the one or more computer-readable storage devices to perform operations comprising:
  receiving, by a vertical reduction interceptor, a data reduction condition of a target microservice, the data reduction condition being provided by a vertical reduction database, wherein
    the data reduction condition is based on historical usage information, of the target microservice, specifying a plurality of types of data not used by the target microservice during an execution of a historical task, and
    the plurality of types of data, not used by the target microservice in the execution of the historical task, is stored as reducible dimensions in the vertical reduction database;
  intercepting, by the vertical reduction interceptor, a sender microservice configured to send parameter data to the target microservice;
  reducing, responsive to identifying that the parameter data meets the data reduction condition of the target microservice provided by the vertical reduction database, a dimension of the parameter data based on the data reduction condition; and
  sending the parameter data to the target microservice, wherein the data reduction condition is further based on at least a specified user profile.

12. The computer program product of claim 11, wherein the program instructions stored on the at least one of the one or more computer-readable storage devices perform the operations further comprising configuring the target microservice to initiate storage of the reducible dimensions in the vertical reduction database.

13. The computer program product of claim 11, wherein the program instructions stored on the at least one of the one or more computer-readable storage devices perform the operations further comprising:
  computing a first number of microservices in a service mesh that perform at least one of a machine learning routine or a data processing routine that is based on an outcome of the machine learning routine;
  classifying each of the first number of microservices as a potential target microservice of one or more potential target microservices; and
  responsive to a transmission of the parameter data to any of the one or more potential target microservices, intercepting the transmission and reducing the dimension of the parameter data.

14. The computer program product of claim 11, wherein the program instructions stored on the at least one of the one or more computer-readable storage devices perform the operations further comprising:
  computing a first number of microservices in a service mesh that perform at least one of a machine learning routine or a data processing routine based on an outcome of the machine learning routine;
  computing a second number of microservices in the service mesh that send the parameter data to any of the first number of microservices;
  classifying each of the first number of microservices as a potential target microservice of one or more potential target microservices and each of the second number of microservices as a potential sender microservice of one or more potential sender microservices; and
  responsive to any of the one or more potential sender microservices sending the parameter data to any of the one or more potential target microservices, intercepting a proxy of the any of the one or more potential sender microservices and reducing the dimension of the parameter data based on the specified user profile.

15. The computer program product of claim 11, wherein the program instructions stored on the at least one of the one or more computer-readable storage devices perform the operations further comprising determining whether the parameter data comprises a dataset having a size that meets a defined large data size threshold.

16. A non-transitory computer-readable storage medium, tangibly embodying a computer readable program code having computer readable instructions that, when executed, causes a processor to carry out a method comprising:
  receiving, by a vertical reduction interceptor, a data reduction condition of a target microservice, the data reduction condition being provided by a vertical reduction database, wherein
    the data reduction condition is based on historical usage information, of the target microservice, specifying a plurality of types of data not used by the target microservice during an execution of a historical task, and
    the plurality of types of data, not used by the target microservice in the execution of the historical task, is stored as reducible dimensions in the vertical reduction database;
  intercepting, by the vertical reduction interceptor, a sender microservice configured to send a parameter data to the target microservice;
  reducing, responsive to identifying that the parameter data meets the data reduction condition of the target microservice provided by the vertical reduction database, a dimension of the parameter data based on the data reduction condition; and
  sending the parameter data to the target microservice, wherein the data reduction condition is further based on at least a specified user profile.

17. The non-transitory computer-readable storage medium of claim 16, wherein the processor further performs the method comprising:
  computing a first number of microservices in a service mesh that perform at least one of a machine learning routine or a data processing routine that is based on an outcome of the machine learning routine;
  classifying each of the first number of microservices as a potential target microservice of one or more potential target microservices; and
  responsive to a transmission of the parameter data to any of the one or more potential target microservices:
    intercepting the transmission; and
    reducing the dimension of the parameter data.

18. The non-transitory computer-readable storage medium of claim 16, wherein the processor further performs the method comprising:

computing a first number of microservices in a service mesh that perform at least one of a machine learning routine or a data processing routine based on an outcome of the machine learning routine;

computing a second number of microservices in the service mesh that send the parameter data to any of the first number of microservices;

classifying each of the first number of microservices as a potential target microservice of one or more potential target microservices and each of the second number of microservices as a potential sender microservice of one or more potential sender microservices;

responsive to any of the one or more potential sender microservices sending the parameter data to any of the one or more potential target microservices:
  intercepting a proxy of the any of the one or more potential sender microservices; and
  reducing the dimension of the parameter data based on the specified user profile.

* * * * *